United States Patent [19]
Shaffer

[11] Patent Number: 5,816,387
[45] Date of Patent: Oct. 6, 1998

[54] HIGH-TEMPERATURE FURNACE AND CERAMIC CONVEYER BELT THEREFOR

[76] Inventor: Peter T. B. Shaffer, 3225 Chimney Cove Dr., Cumming, Ga. 30131-7711

[21] Appl. No.: 714,374

[22] Filed: Sep. 16, 1996

[51] Int. Cl.⁶ .................................................. B65G 23/00
[52] U.S. Cl. ......................... 198/792; 198/850; 198/952
[58] Field of Search ................................. 198/792, 832.2, 198/850, 851, 853, 952

[56] References Cited

U.S. PATENT DOCUMENTS

| | | |
|---|---|---|
| 1,895,072 | 1/1933 | Fenton et al. . |
| 2,986,387 | 5/1961 | Illing .............................................. 263/8 |
| 3,876,061 | 4/1975 | Hammitt ................................. 198/792 |
| 3,920,117 | 11/1975 | Roinestad ................................. 198/194 |
| 4,911,681 | 3/1990 | Funkhouser ........................... 198/851 X |
| 4,951,807 | 8/1990 | Roinestad et al. .................. 198/792 X |
| 5,137,138 | 8/1992 | Campbell, III ....................... 198/792 X |
| 5,141,379 | 8/1992 | Warga ........................................ 414/157 |
| 5,197,593 | 3/1993 | Funkhouser .............................. 198/851 |
| 5,330,046 | 7/1994 | Yuzawa et al. .......................... 198/850 |
| 5,558,204 | 9/1996 | Dasinger ................................... 198/778 |

*Primary Examiner*—James R. Bidwell
*Attorney, Agent, or Firm*—David E. Dougherty

[57] ABSTRACT

A high-temperature, conveyer-type furnace includes a selectively flexible-inflexible conveyer belt for transporting articles through the furnace. The belt, which is preferably made of ceramic, includes a plurality of longitudinally-extending, pivotally-interconnected links and a locking mechanism for locking the links into a relatively inflexible mode when the belt is subjected to longitudinal compression so that the belt can be pushed through the furnace.

19 Claims, 3 Drawing Sheets

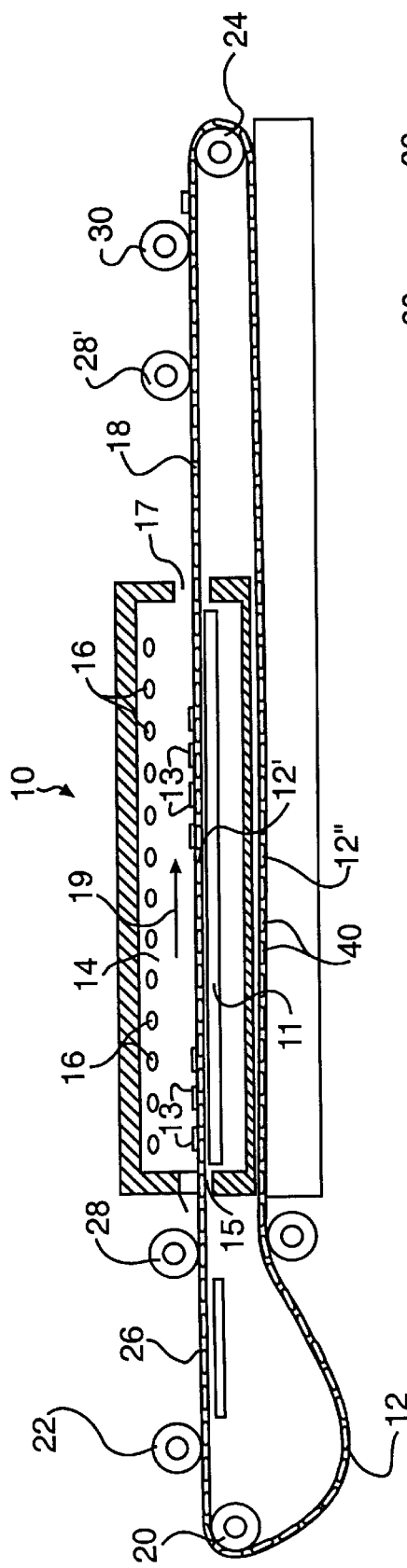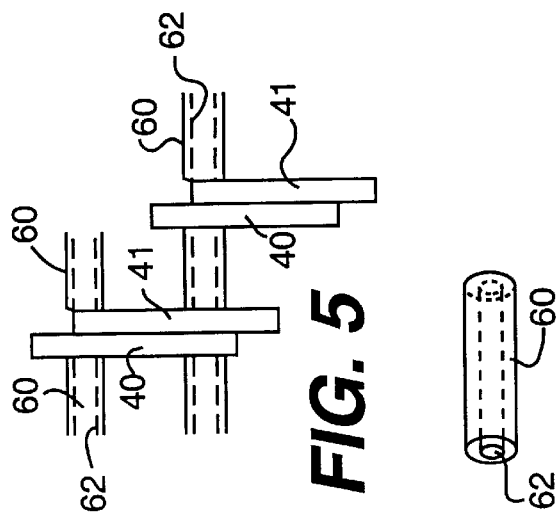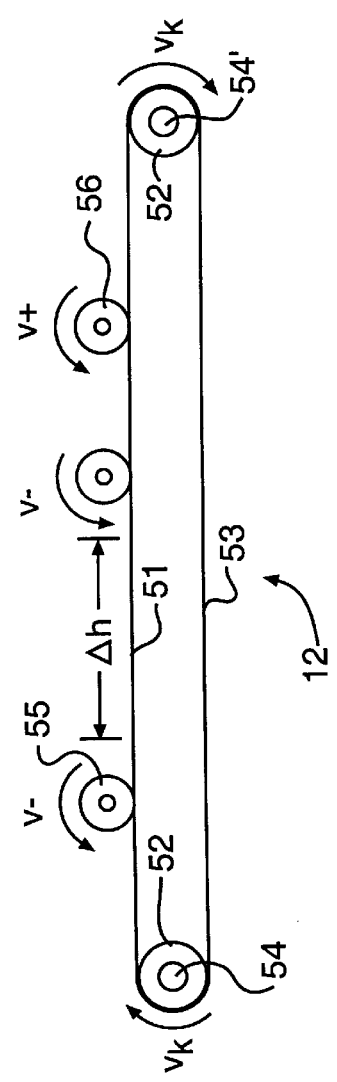
FIG. 1
FIG. 5
FIG. 6
FIG. 4

HIGH-TEMPERATURE FURNACE AND CERAMIC CONVEYER BELT THEREFOR

FIELD OF THE INVENTION

This invention relates to a high-temperature furnace of the type having a conveyer belt passing therethrough and more particularly to a selectively flexible-inflexible conveyer belt and link assembly which is subjected to compression as the belt passes through the furnace.

BACKGROUND FOR THE INVENTION

An increased interest in continuous high-temperature furnace sintering has led to a number of developments in ceramic conveyer belts for use in high-temperature furnaces. For example, an article, "Ceramic Belt Development for High Temperature Sintering by Bruce Cole" (Industrial Heating, June 1992) reports on the development of a ceramic belt which is capable of maintaining a consistently high throughput capability at temperatures above 1150° C. As reported in that article, the development of such belts and selection of materials for such belts involves a consideration of material strength, thermal conductivity (for achieving rapid heat-up and cool-down), thermal shock resistance, capability of withstanding repeated furnace cycles while experiencing minimal ageing or thermal fatigue which promotes premature failure due to a buildup of internal stresses, minimum weight in order to minimize the amount of waste energy, durability and cost. It has been recognized that it is not possible to optimize each of the above considerations. Nevertheless, compromises have been made, and an alumina or aluminum oxide belt has been developed.

It has also been recognized that ceramic belts such as alumina conveyer belts and belts of other ceramic materials are weakest under tension, i.e., when being pulled, particularly at elevated temperatures. For this reason prior art belts were designed with individual links which were strong enough at elevated temperatures so that they are not pulled apart in tension while in a furnace. However, increasing the strength of each link adds to the weight and cost of the belt and detracts from the thermal efficiency. The strength decreases as temperatures are increased, thus, limiting useful temperatures of all ceramics when under tension.

Other approaches to developing ceramic conveyer belts for high-temperature furnaces are disclosed in the U.S. patents of Funkhouser (U.S. Pat. No. 5,197,593) and Warga (U.S. Pat. No. 5,141,397), both of which are incorporated herein in their entirety by reference. The Funkhouser patent discloses conveyor belts which are made totally of ceramic materials for use at elevated temperatures. The belts include a plurality of ceramic bars interconnected by a plurality of interconnecting rods disposed through holes formed in the bars so that each bar is interconnected by two rods. In such belts an end fixation hold the bars on the rods. The end fixation comprises a mechanism for preventing an enlarged opening from aligning with the rods after the edge links are disposed on the rods to preclude the edge links from falling off the rods. The Warga patent discloses a ceramic conveyer belt wherein short partial rods in a offset arrangement are used to obtain greater service life.

Notwithstanding the aforementioned developments, there is a continuing demand for increasingly higher temperature furnaces and ceramic conveyer belts that are operable at even higher temperatures as, for example, in excess of 1500° C.

It has now been found that an improved furnace and conveyer belt construction in accordance with the present invention offers a number of advantages over the prior art devices. For example, it is believed that such furnaces and conveyer belts are capable of operating with repeated heating and cooling cycles at temperatures in excess of 1300° C. and perhaps at temperatures in excess of 1500° C. It is also believed that the belts in accordance with the present invention have greater strength and durability than prior art conveyers, competitive costs, ability to withstand numerous heating and cooling cycles and are of relatively light weight. The belts disclosed herein also have favorable thermal conductivity and thermal shock resistance.

BRIEF SUMMARY OF THE INVENTION

In essence, the present invention contemplates a high-temperature, conveyer-type furnace in which a ceramic or other type of conveyer transports articles through the furnace at an elevated temperature. The furnace includes means for defining a chamber and heating means for raising the temperature within the chamber to an elevated temperature as, for example, in excess of 1100° C. The conveyer belt (preferably made of a ceramic material) is an endless belt with at least a portion running through the chamber and with a return run which may or may not be outside of the furnace chamber. Means are also provided for pushing the belt through the furnace so that the belt is not subjected to tension while it is in the chamber at an elevated temperature. In a preferred embodiment of the invention, means are also provided to prevent the belt from buckling as it is pushed through the chamber.

The invention also contemplates a selectively flexible-inflexible ceramic conveyer belt for use in a high-temperature furnace or the like. The ceramic conveyer belt comprises a plurality of longitudinally extending ceramic links which are capable of withstanding repeated heating and cooling cycles. The links are pivotally interconnected to form an endless belt and means, are provided for subjecting the belt to longitudinal compression. Locking means are also provided for locking the links into a relatively inflexible mode when the belt is subjected to longitudinal compression. Means are then provided for releasing the longitudinal compression to thereby render a plurality of links into a flexible mode.

In a preferred embodiment of the invention, each of the links defines or includes a locking element, a first aperture and a second or longitudinally extending aperture therethrough, together with means for interacting with the locking element of a longitudinally adjacent link. A plurality of ceramic rods interconnects the links, with a first of the rods passing through the first aperture of one of the links and through the longitudinal aperture of an adjacent link to thereby permit pivotal movement between adjacent links when tension on the belt positions the rod in a first position with respect to the longitudinally extending aperture of the longitudinally adjacent link. Means are also provided to subject the belt to longitudinal compression to position the rod in a second position in the longitudinally extending aperture. Positioning the rod in the second position at one end of the longitudinally extending aperture causes the locking element to engage the means for interacting with the locking element to prevent pivotal movement between adjacent links.

In a further embodiment of the invention, an endless conveyer belt assembly includes a plurality of pivotally connected links and means for guiding the belt along a first run, around the guide means and along a return run. Drive means are provided for imparting linear motion to the belt to move the belt along the first run, around the guide means and back along the return run. The drive means includes a first and a second primary drive mechanism, such as a pair of drive sprockets, for moving the belt at a predetermined velocity for transporting articles along the length of the first run. The drive means also includes a pair of intermediate drive mechanisms such as a second pair of drive sprockets which are disposed between the first and second primary drive mechanisms. A first of the intermediate drive mechanisms moves a first portion of the belt at a velocity which is slightly less than the velocity imparted by the first and second primary drive mechanisms so that the links in the belt are longitudinally compressed as they pass the first intermediate drive mechanism. The second intermediate drive mechanism moves at the same speed as the first intermediate drive mechanism and is disposed on the opposite side of the furnace and maintains the longitudinal compression on the links as they pass through the furnace. The second primary drive mechanism moves the conveyer belt at the same speed as the first primary drive mechanism, ie., slightly faster than the intermediate drive mechanism, so that the links in the belt are pulled apart or placed under longitudinal tension after the belt passes the second intermediate drive mechanism.

BRIEF DESCRIPTION OF THE DRAWINGS

FIG. 1 is a side elevational view which illustrates a high-temperature furnace in accordance with a first embodiment of the invention;

FIG. 4 is a schematic illustration of a drive mechanism for an endless belt assembly in accordance with a further embodiment of the invention;

FIG. 5 is a top or plan view which illustrates a second embodiment of the inventions; and FIG. 6 is a perspective view of a ceramic spacer of the type used in the second embodiment of the invention.

DESCRIPTION OF THE PREFERRED EMBODIMENTS OF THE INVENTION

Figure 2A:
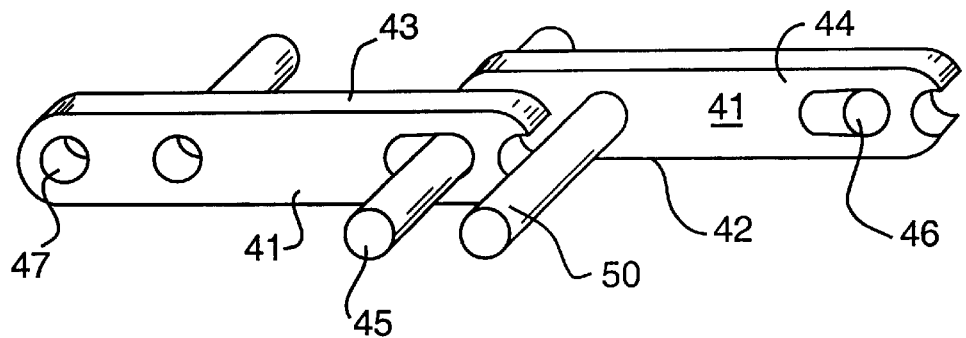
FIG. 2A is a perspective view of a pair of links in a ceramic conveyer belt in accordance with the present invention wherein the links have been subjected to longitudinal tension so that the belt is in a flexible mode.

The invention will now be described in detail in connection with the accompanying drawings wherein like reference numerals have been used to designate like parts.

A high-temperature furnace 10 of the type having a ceramic conveyer belt 12 for transporting articles 13 through the furnace 10 is shown in FIG. 1. As illustrated, the furnace 10 includes a chamber 14 which forms a high-temperature zone for heating articles 13 to a temperature in excess of 1100° C. and preferably in excess of 1350° C. It is presently believed that a furnace in accordance with the present invention will withstand repeated cycles of up to at least about 1500° C. using conventional ceramic materials such as alumina in the links of the conveyer belt. A plurality of heating elements or burner jets (tuyeres) 16 are provided for raising the temperature within chamber 14.

The chamber 14 is at least partially enclosed, but includes an entrance area or opening 15 and an exit area or opening 17 to allow the ceramic belt 12 to pass into, through and out of chamber 14 in the direction of arrow 19.

The furnace 10 also includes a cooling area 18 where the heated articles 13 are partially cooled before removal from the belt 12. It should be recognized that the cooling area 18 may be exposed to the room temperature over part or all of its length depending on the desired rate of cooling, as will be well understood by those skilled in the art of high-temperature furnace design, construction and operations. It should also be recognized that the cooling area may be considerably longer than the length of the chamber 14 so that the articles 13 may be sufficiently cooled before removal from the conveyer belt 12.

As illustrated, the conveyer belt 12 includes a first or upper portion 12' and a lower portion or return run 12". The upper portion 12' extends longitudinally along a horizontal plane and is supported by conventional plate means 11 such as a refractory surface as it passes into, through and out of the high-temperature zone of chamber 14 and across cooling area 18.

The ceramic conveyer belt 12 passes around a guide pulley 20 at one end of furnace 10 and is engaged by a sprocket or drive assembly 22. The drive assembly 22 or sprocket pulls the belt to thereby place the belt 12 under longitudinal tension and moves the belt 12 at a constant or preselected velocity. The belt 12 then passes through the chamber 14, along cooling area 18 and around a second guide pulley 24 at the opposite end of the furnace 10. The drive assembly 22 also pulls the belt 12 from guide pulley 24 along its return run and around the guide pulley 20. A second drive sprocket or tension means 30 is disposed at the opposite end of the furnace 10 and moves the belt 12 at the same speed as drive assembly 22.

The drive assembly 22 is preferably located between the guide pulley 20 and the entrance 15 to the chamber 14 since the belt will become rigid, i.e., under compression after passing drive pulley 22. As shown, the drive assembly is separated from the entrance 15 by a loading zone 26 and by a compression means 28. The compression means 28 such as a first intermediate drive sprocket or brake slows the movement of a first portion of the conveyer belt 12 or moves it at a slightly slower rate than the drive assembly 22 so that the links in the belt are subjected to longitudinal compression. As the links are subjected to longitudinal compression, they are pushed through the chamber 14 and toward the cooling area 18 by the subsequent links which are propelled by drive assembly 22.

Since a ceramic material at elevated temperatures is considerably stronger under compression than it is under tension, it is possible to operate the furnace 10 at a higher temperature than if the same belt were pulled through the high-temperature zone under tension. Accordingly, it is possible to use a lighter belt and achieve other advantages in furnace design by subjecting he belt to longitudinal compression as it passes through he furnace. At the same time it is necessary to provide a locking mechanism to prevent the conveyer belt 12 from buckling as it is pushed through the furnace 10.

A control means 28' is also provided to maintain the conveyer belt 12 in its compressed state during its travel through the chamber 14. The control means 28' may, for example, take the form of a second intermediate drive sprocket which moves at the same rate, i.e., provides the same linear speed to the belt 12 as the compression means 28. Thus, the control means 28' prevents the links which are under compression within the chamber 14 from being stretched apart, i.e., placed under tension until they have passed through the chamber 14 and passed the control means 28'.

The tension means 30, such as an additional drive sprocket, is disposed on the opposite side of chamber 14 and beyond the control means 28'. The tension means 30 engages the belt 12 in order to place the links under tension before they are conveyed around guide pulley 24, along the return run and around the guide pulley 20. The tension means 30 moves a second portion of the belt 12 at the preselected velocity, i.e., at the same linear speed as provided by drive assembly 22. The links are constructed and arranged so that the longitudinal compressive forces on the links are removed and the links placed under tension as the links pass the tension means 30. In effect, the links are stretched apart or put under slight tension by speeding up the movement of the belt sufficiently to pull the individual links out of their locking engagement.

In a preferred embodiment of the invention, placing the links under longitudinal compression locks the links into a relatively inflexible state so that the belt 12 can be pushed through chamber 14 without buckling. By contrast, when a second portion of the belt, ie., the portion which is outside of the chamber 14, is speeded up slightly by tension means 30, the links are pulled apart or out of locking engagement with one another so that the belt 12 will readily bend as it follows around pulley guides 20 and 24.

Figure 2B:
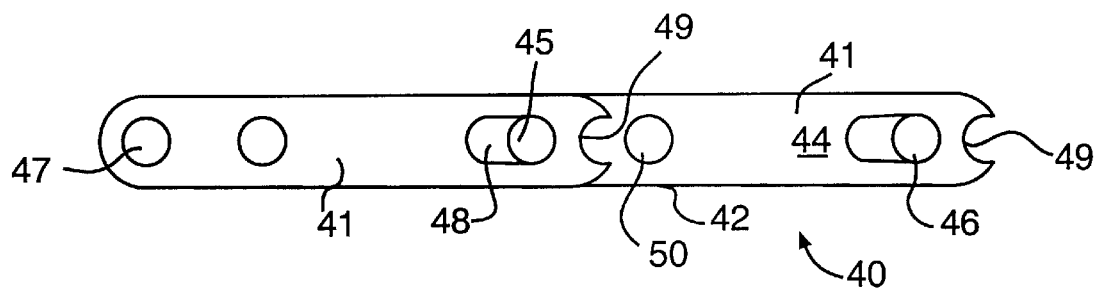
FIG. 2B is a side elevational view of the belt links shown in FIG. 2A.
Figure 2C:
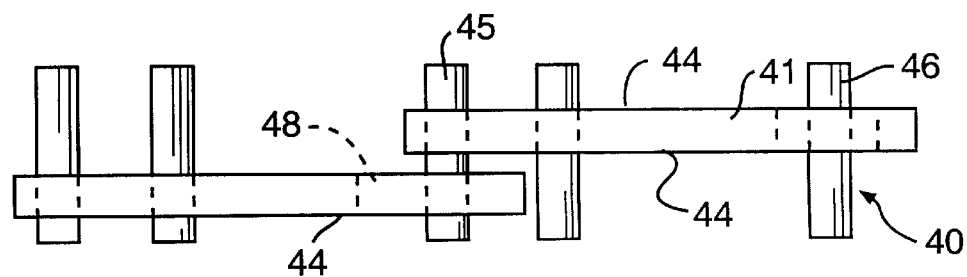
FIG. 2C is a top or plan view of the belt links shown in FIGS. 2A and 2B.
Figure 3A:
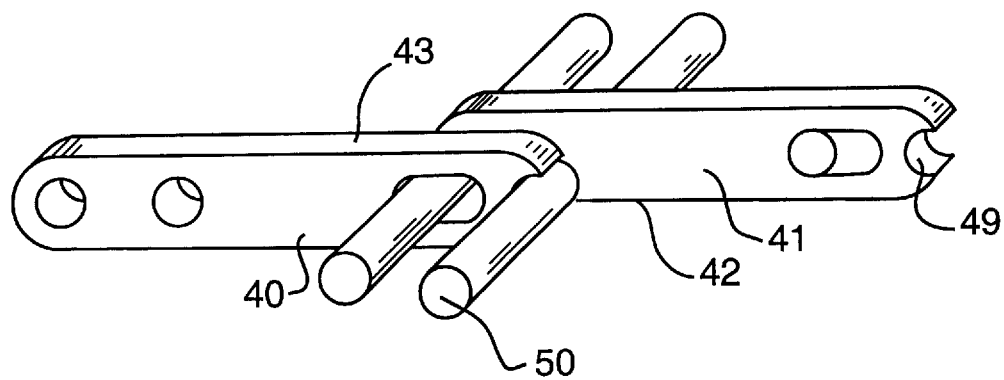
FIG. 3A is a perspective view of a pair of belt links as shown in FIGS. 2A–C but shown under longitudinal compression to lock the belt into an inflexible mode.
Figure 3B:
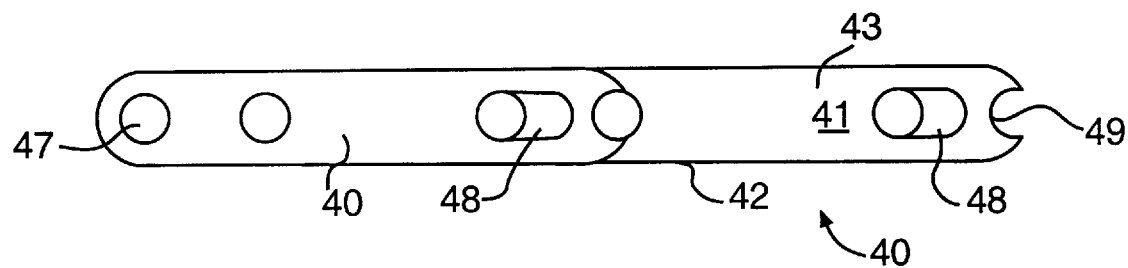
FIG. 3B is a side elevational view of the belt links shown in FIG. 3A.
Figure 3C:
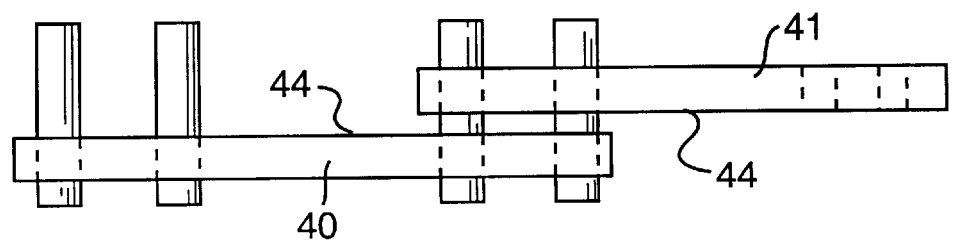
FIG. 3C is a top or plan view of the links shown in FIGS. 3A and 3B.

The selectively flexible-inflexible ceramic conveyer belt will be described in more detail in connection with FIGS. 2 and 3. As illustrated therein, a selectively flexible-inflexible ceramic conveyer belt for use in a high-temperature furnace or the like includes a plurality of longitudinally extending ceramic links 40 which may be made entirely of alumina or other ceramic or refractory material which is capable of withstanding repeated heating and cooling cycles. It should be understood that the conveyer belt 12 may be made of a metal, alloy, graphite, composite or other material which has better high-temperature strength or creep resistance in compression as compared to its behavior under tension. Each individual link 40 includes an elongated bar-like element 41 with a generally-rounded end as shown in FIGS. 2 and 3. Between the rounded ends the links 40 have a relatively flat or straight base 42 which may or may not act as a skid upon which the link is moved across a kiln or furnace floor. The element 41 also includes a relatively flat or straight upper portion 43 which acts as a rest or support for articles placed thereon for heat treatment by being passed through chamber 14.

In a preferred embodiment of the invention, the bar-like elements 41 are about 2 to 2½ inches long with a height of about ½ inch and width of about ¼ inch. The sizing will, of course, vary from one installation to another, but should be of sufficiently small size to minimize heat loss attributed to heating and cooling of the belt as the articles 13 are transported through the furnace 10.

Side faces 44 of element 41 are in facial engagement with one another. The links 40 may be assembled in cross rows in a staggered relationship in conveyer belt 12 and are connected together by cross rods 45 and 46. Each of the elements 41 defines a first aperture near the trailing edge of the bar-like element and a longitudinally extending aperture or channel 48 which passes through element 41. As illustrated, each of the elements also defines a locking element such as a locking groove 49 which is constructed and arranged to engage or interact with a locking pin 50.

A further embodiment of the invention is illustrated in FIG. 4. As shown therein, an endless conveyor belt 12 includes a plurality of pivotally connected links 40 and guiding means 52 for guiding the belt along a first run 51, around the guide means 52 and along a return run 53. Drive means 54 is provided for imparting linear motion to the belt to thereby move the belt 12 along the first run 51, around the guide means 52 and back along the return run 53. The drive means 54 includes a first and a second primary drive mechanism such as a pair of drive sprockets for moving the belt at a predetermined velocity and for transporting articles 13 along the length of the first run 51 as, for example, through a high-temperature furnace. The drive sprockets 54 may also act as the guide means 52. The drive means 52 also includes a pair of intermediate drive mechanisms such as a pair of drive sprockets 55 and 56 which are disposed between the first and second primary drive mechanisms along the first run 51. A first of the intermediate drive mechanisms 55 moves a first portion of the belt at a velocity which is slightly less than the velocity imparted by the first and second primary drive mechanisms 54 so that the links 40 in the belt 12 are compressed as they pass the first intermediate drive mechanism 55. The second intermediate drive mechanism 56 moves at the same speed as mechanism 55 to thereby maintain the links 40 under compression, i.e., to keep the links from being pulled apart or into their unlocked condition by the second sprocket or drive means 54'. The second sprocket 54' moves the belt 12 at a linear velocity which is slightly greater than the linear velocity provided by the sprockets 55 and 56 so that the links in the belt are pulled apart or placed under longitudinal tension as the belt passes the second intermediate drive mechanism 56. In a preferred embodiment of the invention, the linear velocity of belt 12, due to the primary drive mechanism 54, is $V_k$ while the velocity of a first portion of belt 12, due to the first of the intermediate drive mechanisms 55, is slightly less than $V_k$. The velocity of a second portion of the belt 12, due to the effect of the second intermediate drive mechanism (sprocket) 56, is slightly slower as it passes through the furnace under compression than the portion which is outside of the furnace and in the return run.

A second embodiment of the invention is shown in FIGS. 5 and 6 wherein a plurality of ceramic spacers 60 is used to separate alternating links 40 and 41. Each of the ceramic spacers 60 includes a central bore or cylindrical opening 62 which is slightly larger in diameter than pin 50 so that the pin 50 can pass therethrough. The belt 12 also includes end fixation means or caps such as those disclosed in the aforementioned Funkhouser patent and as will be well understood by those of ordinary skill in the art.

While the invention has been described in connection with its preferred embodiments, it should be understood that changes and modifications can be made therein without departing from the scope of the appended claims.

What is claimed is:

1. A high-temperature furnace of the type having a conveyer belt for transporting an article through a chamber at an elevated temperature comprising means defining a chamber and means for heating said chamber to an elevated temperature, a conveyer belt passing through said chamber, means for pushing said belt through said chamber to transport articles placed thereon through said chamber for heat treatment thereof and means to prevent said belt from buckling as it is pushed through said chamber under compression.

2. A high-temperature furnace of the type having a conveyer belt for transporting an article through a chamber at an elevated temperature according to claim 1 in which said conveyer belt is an endless ceramic belt including a plurality of links passing through said chamber, and in which said means for pushing said belt through said chamber subjects said belt to longitudinal compression as it is passed through said chamber.

3. A high-temperature furnace of the type having a conveyer belt for transporting an article through a chamber at an elevated temperature according to claim 2 in which the chamber includes a high-temperature zone and in which the compressive forces are applied longitudinally along the length of each link which is within the high-temperature zone.

4. A high-temperature furnace of the type having a conveyer belt for transporting an article through a chamber at an elevated temperature according to claim 3 which includes means for maintaining said links under compression while said links are within said chamber.

5. A high-temperature furnace of the type having a conveyer belt for transporting an article through a chamber at an elevated temperature according to claim 4 in which each of said links includes a locking groove for locking said links together to thereby prevent said links from buckling as they are pushed through said chamber.

6. A high-temperature furnace of the type having a conveyer belt for transporting an article through a chamber at an elevated temperature according to claim 5 which includes means for removing compressive forces from said belt as it passes out of said chamber.

7. A high-temperature furnace of the type having a conveyer belt for transporting an article through a chamber at an elevated temperature according to claim 5 in which each of said links includes a pair of parallel longitudinally extending members and a transverse rod connecting said cross members and in which said longitudinally extending members each includes forward and rear portions and defines a locking groove in said forward portion thereof.

8. A high-temperature furnace of the type having a conveyer belt for transporting an article through a chamber at an elevated temperature according to claim 7 in which said belt includes first and second portions passing into and out of said chamber and means for compressing said first portion of said belt as it passes through said chamber and for expanding said second portion of said belt as it passes out of said chamber.

9. A high-temperature furnace of the type having a conveyer belt for transporting an article through a chamber at an elevated temperature according to claim 8 in which said means for longitudinally compressing said first portion of said belt comprises second drive means which moves said belt at a slightly slower rate than said means for driving said belt in a first direction and said means for longitudinally expanding said second portion of said belt comprises third drive means which moves said second portion of said belt at the same rate as said means for driving said belt in a first direction.

10. A high-temperature furnace of the type having a conveyer belt for transporting an article through a chamber at an elevated temperature according to claim 9 in which said means for driving said belt in a first direction at a predetermined speed comprises first sprocket means, said means for longitudinally compressing said first portion of said belt comprises second sprocket means which is rotated at a speed to move said first portion of said belt at a speed which is slightly slower than the speed induced by said first sprocket means and in which said means for expanding said second portion of said belt comprises third sprocket means which is rotated at a speed to move a relatively short length of said second portion of said belt at a speed that is slightly faster than the movement of said belt in its compressed state.

11. A selectively flexible-inflexible conveyer belt for use in a high-temperature furnace or the like comprising a plurality of longitudinally extending ceramic links which is capable of repeated heating and cooling cycles, said links pivotally interconnected to form an endless belt, means for subjecting said belt to longitudinal compression to thereby lock a plurality of said links in a relatively inflexible mode and means for releasing said longitudinal compression to thereby render a plurality of links in a flexible mode.

12. A selectively flexible-inflexible conveyer belt for use in a high-temperature furnace or the like according to claim 11 in which said means for releasing said longitudinal compression stretches a portion of said belt longitudinally.

13. A selectively flexible-inflexible conveyer belt for use in a high-temperature furnace or the like according to claim 12 in which each of said longitudinal members includes a forward and rear portion and means defining a longitudinally extending channel in said rear portion thereof and in which said transverse member is rod-shaped and slidably disposed in said channel for movement forward and rearwardly therein.

14. A selectively flexible-inflexible conveyer belt for use in a high-temperature furnace or the like according to claim 13 in which said longitudinal members define locking grooves in forward portions thereof which are adapted to engage the rod shaped transverse member of an adjacent link.

15. An endless conveyer belt assembly for use in a high-temperature furnace or the like comprising a plurality of pivotally interconnected links, guide means for guiding said belt along a first run around said guide means and along a return run, drive means for providing linear movement to said belt to thereby move said belt along its first and return runs, said drive means including a first and a second primary drive mechanism spaced from one another about said belt for moving said belt at a preselected linear velocity and a pair of intermediate drive mechanisms disposed about said belt and between said first and said second primary drive mechanisms, a first of said intermediate drive mechanisms moving a first portion of said belt at a velocity which is less than the linear velocity provided by said first and second primary drive mechanisms and said second of said intermediate drive mechanisms moving a second portion of said belt at a linear velocity which is less than the linear velocity provided by said first and second primary drive mechanisms whereby the links in said belt are subjected to longitudinal compression by said first intermediate drive mechanism and the longitudinal compression is maintained by said second intermediate drive mechanism.

16. An endless conveyer belt assembly for use in a high-temperature furnace or the like in accordance with claim 15 in which said intermediate drive mechanisms are disposed in said first run of said belt.

17. An endless conveyer belt assembly for use in a high-temperature furnace or the like in accordance with claim 15 in which said links in said belt are made of a ceramic material.

18. An endless conveyer belt assembly for use in a high-temperature furnace or the like in accordance with claim 16 in which said first and second drive means comprise a pair of sprockets.

19. An endless conveyer belt assembly for use in a high-temperature furnace or the like in accordance with claim 18 in which said pair of intermediate drive mechanisms is a pair of sprockets.

\* \* \* \* \*